Sept. 10, 1957  A. H. FREDRICK  2,806,198
LOAD SHARING CIRCUIT
Filed Jan. 28, 1953  2 Sheets-Sheet 1

INVENTOR.
ARDEN H. FREDRICK
BY
*H. L. Mackey*
ATTORNEY

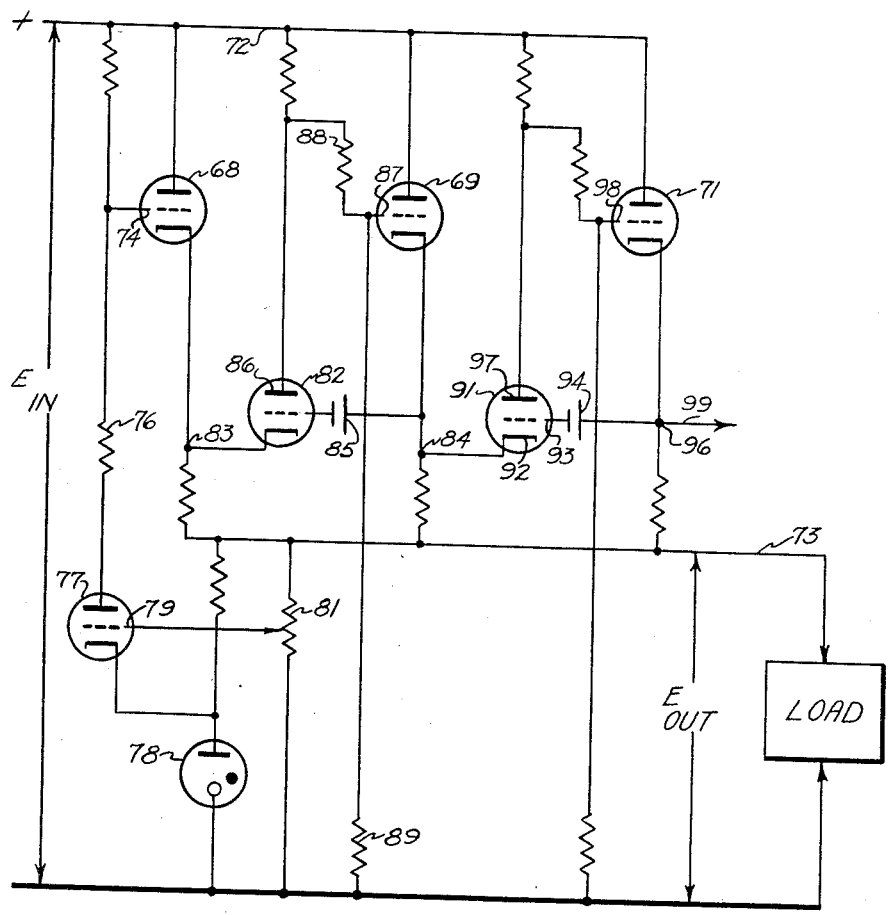

United States Patent Office 2,806,198
Patented Sept. 10, 1957

2,806,198
LOAD SHARING CIRCUIT

Arden H. Fredrick, Mount Kisco, N. Y., assignor to General Precision Laboratory Incorporated, a corporation of New York Application January 28, 1953, Serial No. 333,770

6 Claims. (Cl. 323—23)

This invention relates to arrangements wherein two or more electronic tubes connected in parallel are forced to share the load current flowing therethrough equally. Although not limited thereto, the invention is particularly applicable to such circuits when used in voltage regulator arrangements. Consequently for a clear understanding of the invention this field of use will be generally stressed but it is to be understood that such emphasis in no way constitutes a limitation as respects the broad utility of the invention.

In the field of electronic voltage control one fundamental circuit contains a triode having its plate connected to the voltage source, a regulated positive voltage being taken from its cathode. The triode's internal resistance is automatically varied in accordance with changes in output voltage so as to minimize them, employing a voltage amplifier tube and some relatively constant voltage device such as a voltage regulator tube, usually termed a reference source.

One limitation of such a circuit is the low current capacity of the series tube. This limitation is inherent in electronic tubes, so that the current is limited that can be supplied to the load through a single tube of a given type. One obvious way of overcoming this limitation is by paralleling two or more tubes to constitute the series tube component of the regulator. It is well known, however, that tube characteristics vary so much from tube to tube, and in any selected tube they vary so much throughout its life that paralleled tubes do not share current equally and the load current ratio also varies with time. This difficulty is greatest when the current drawn through the tubes is direct current. Paralleled tubes can be forced to share the load more equably by adding series plate resistors, but this drastically reduces the power output. A better method is to add series cathode resistors, although this still reduces the possible output power materially and in proportion to the magnitude of the cathode resistance.

This invention employs very small cathode resistors to develop resistor potential drops. These potential drops are amplified and compared and a potential representative of their difference is employed to balance the paralleled tubes in the series tube element. By employing sufficient amplification the cathode resistances can be reduced in value as much as desired, thus removing any limitation of these resistances on the power output, and by proper proportioning of the circuit the load sharing is exact.

The circuits of this invention are applicable to any number of tubes in parallel.

One purpose of this invention is to provide a circuit to force several paralleled electronic discharge tubes to share the total load current equally.

Another purpose is to provide, in an electronic regulated voltage supply employing paralleled series regulating tubes, a circuit forcing the currents in the several paralleled tubes to be equal.

A further understanding of this invention may be secured from the detailed description and associated drawings, in which:

Figure 6 illustrates extension of the invention to any number of tubes.

Figure 1:
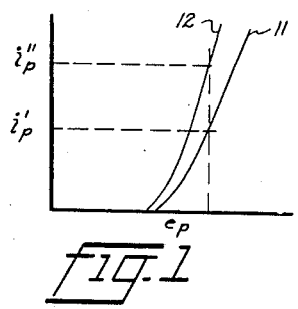
Figure 1 is a graph showing variations in tube characteristics.
Figure 2:
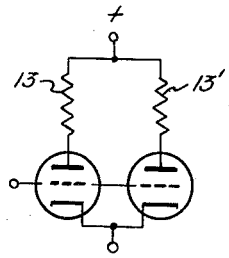
Figures 2 and 3 show elementary forms of tube balancing circuits.
Figure 3:
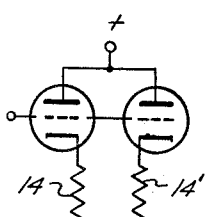

Referring now to Fig. 1, the plate voltage vs. current characteristic curve of a selected triode is shown at 11. Another triode of the same type, when operated at the same grid bias, may have a characteristic curve 12 because of random differences in manufacture. When two such tubes are paralleled at plate, cathode and grid, they have the same plate voltage supply and the same grid voltage but, as shown by the dashed lines in Fig. 1, these tubes will draw widely different plate currents $i_p'$ and $i_p''$. When identical resistors are inserted in the plate circuits as in Fig. 2 the unbalance is reduced by the amount of the difference in the RI drops in the resistors 13 and 13'. When the resistors are inserted in the cathodes as in Fig. 3 at 14 and 14', reduction of unbalance results in the same way but in greater amount in proportion to the amplification constant because of feedback. It is obvious that the balancing effect can never be complete, and in order to secure even a fair balancing effect the cathode resistors must be so large that they limit the tube output seriously.

Figure 4:
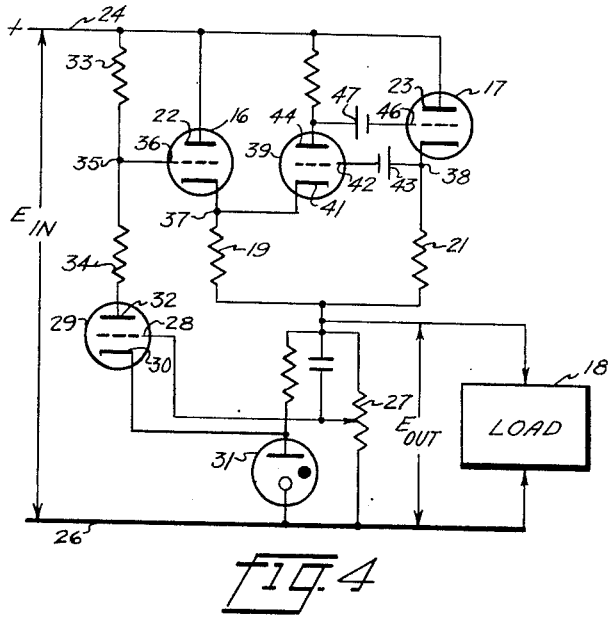
Figures 4 and 5 illustrate two embodiments of the tube balancing circuit of the invention.

One use for the instant invention is in an electronic voltage regulator employing a series resistance tube component to maintain the output voltage constant, and in which the series resistance tube component contains two electronic tubes connected effectively in parallel. That is, their plate-cathode space resistances are in parallel and the combination of resistances is in series with the load. Fig. 4 shows such a circuit employing two resistance tubes 16 and 17 which operate in this manner with their internal resistances effectively in parallel and their combined resistance in series with a load 18.

Each resistance tube is provided with a very small cathode resistor 19 and 21, each having a value, for example, of 100 ohms. The resistance tube plates 22 and 23 are paralleled and connected to the positive input voltage conductor 24. Input voltage of, say, 500 volts is applied between the conductor 24 and ground conductor 26 connected to the output filter of an electronic direct current voltage supply. Changes in the output voltage $E_{out}$ are applied through the voltage divider 27 to the control grid 28 of a voltage amplifier tube 29. The cathode 30 of the tube 29 is connected to a relatively constant potential point by being bridged to ground through a voltage regulator tube 31, and the plate 32 is connected to the input positive conductor 24 through resistors 33 and 34, the common terminal 35 of which is connected to the control grid 36 of resistance tube 16.

In operation the tube 29 senses changes in the output voltage $E_{out}$, and the resulting changes in its plate resistance with accompanying changes in the voltage applied to grid 36 cause the plate resistance of tube 16 to vary in such direction as to tend to overcome the output voltage change. Change in the plate resistance of tube 16 is accompanied by change in its plate current. Load voltage is readily adjusted manually by use of the divider 27.

The plate current through tube 17 is made to be equal at all times to the plate current through tube 16 in the following manner. The plate current through each of the tubes 16 and 17 is exactly represented by the voltage drop through each of the two equal cathode resistors 19 and 21. Since these resistors are connected together at their lower ends, their voltage drops are represented by the voltage levels at their upper ends 37 and 38. These levels are compared and their difference is sensed and amplified by a differential direct-coupled amplifier. Such an amplifier may be of any form and may have as many stages as desired, but for the purpose of explanation a very simple form is employed comprising merely a triode 39. The triode cathode 41 is connected to the resistor terminal 37 and the control grid 42 is connected to the resistor terminal 38 through a suitable biasing source such as a battery 43 to apply a suitable fixed bias to the tube, so that any fluctuation in the relative voltages at the terminals 37 and 38 appears as an amplified direct voltage level fluctuation at the plate 44 relative to its cathode 41. This plate potential change is applied to the grid 46 of triode 17 through a suitable biasing battery 47, the relative proportions of components being such that when the current through tube 17 is less than that through tube 16, the resistance of tube 17 is reduced until the currents are equal, and vice versa.

The battery 43 can be eliminated by introducing a suitable small inequity in the resistors 19 and 21, and in place of the battery 47 there can be substituted a potential divider circuit for applying the appropriate bias to the grid 46.

Figure 5:
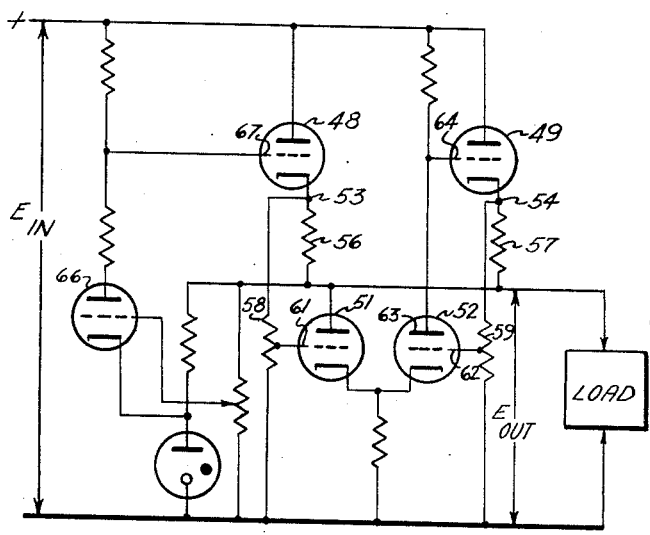

The substitution of a 2-tube direct-coupled amplifier stage in place of the single-tube amplifier 39 of Fig. 4 is shown in Fig. 5. Tubes 48 and 49 constitute the paralleled series resistance tubes and their plate currents are balanced by a differential amplifier comprising triodes 51 and 52. The potential levels at the terminals 53 and 54 of cathode resistors 56 and 57 are sampled and reduced in like ratio by the similar voltage dividers 58 and 59. Taps thereon are connected to the differential amplifier grids 61 and 62, and output is derived from the plate 63 and applied to grid 64 of the series resistance tube 49.

In operation, relative changes in level at terminals 53 and 54 operate through the direct-coupled amplifier to change the resistance of tube 49 in a direction to bring the levels toward equality. The voltage amplifier which samples the output voltage and controls the output voltage level includes a triode 66 in a circuit similar to that of Fig. 4 by which changes in $E_{out}$ cause the grid 67 of tube 48 to change in such direction as to tend to correct the output voltage.

The utility of this invention is not confined to the balancing of only two paralleled resistance tubes. On the contrary, any number of tubes, preferably of the same type, can be paralleled and balanced using either described type of direct-coupled amplifier. Fig. 6 illustrates the manner in which three tubes can be paralleled and balanced, with provision for extension of the circuit to include any number of additional paralleled tubes. In this figure the three paralleled tubes 68, 69 and 71 have their anodes connected together and to an input conductor 72. Their cathodes are connected through low identical resistances to an output conductor 73. The potential of the grid 74 of tube 68 is controlled through a resistor 76 by a voltage amplifier triode 77 having its cathode connected to a voltage regulator tube 78. The grid 79 thereof is sensitive to output voltage changes by means of its connection to a voltage divider 81 connected in shunt to the output.

The current through the second series resistor tube 69 is balanced with that of tube 68 by means of a direct-coupled amplifier comprising triode 82, having its cathode connected to the cathode resistor terminal 83 of tube 68, and having its grid connected to the cathode resistor terminal 84 of tube 69 through bias battery 85. The amplified differential voltage is applied from the plate 86 to the grid 87 through resistor 88. An additional resistor 89 applies adequate bias to grid 88, eliminating the need for a bias battery.

As thus far described the circuit is similar to that of Fig. 4, and operates similarly to balance the currents of tube 71 with that of tube 69 an additional differential amplifier tube 91 is employed, its circuit being similar to that of tube 86. The cathode 92 is connected to the cathode resistor terminal 84 of tube 69 and the grid 93 is connected through biasing battery 94 with the cathode resistor terminal 96 of tube 71. The output from plate 97 is applied to the grid 98 to make the current through tube 71 equal to that through tube 69. Conductor 99 represents a connection which can be made to one or more additional series tube circuits, each being provided with equalizing components having the same configuration as that equalizing tube 71 with tube 69. An indefinitely large number of series resistance tubes can thus be paralleled and their currents made equal, thus accommodating a load drawing any current magnitude.

What is claimed is:

1. A load sharing circuit comprising, a pair of discharge tubes each having at least an anode, cathode and control grid, each of said tubes having their anodes connected to an input terminal, and their cathodes connected through cathode resistors individual to each of said tubes to a terminal of a utilization circuit, means for applying a control potential to the control grid of one of said discharge tubes, and means operated by the potential difference of the cathodes of said tubes for applying a potential to the control grid of the other of said tubes in a sense such as to mitigate the potential difference between said cathodes and to cause the anode-cathode currents flowing through said tubes to be equalized.

2. A load sharing circuit comprising, a pair of discharge tubes each having at least an anode, cathode and control grid, the anodes being connected to a source of positive potential and the control grid of one of said tubes being connected to a source of control potential, a pair of resistors each having one end terminal connected to a respective cathode and their remaining end terminals connected together and to a utilization circuit, a differential amplifier having a pair of input terminals each connected to a respective cathode, the output of said differential amplifier being connected to the control grid of the other of said pair of tubes whereby the potential difference existing between the cathodes of said tubes is reduced and said tubes are constrained to carry an equal current load.

3. A load sharing circuit comprising, a pair of discharge tubes each having at least an anode, cathode and control grid, said tubes being connected in parallel with each other and in series with a utilization circuit, means in each of the anode-cathode circuits of said pair of tubes for producing a potential difference between similar terminals in the anode-cathode circuits, the sense and magnitude of which is proportional to the relative currents flowing through said tubes, a direct coupled differential amplifier having an input circuit connected to said similar terminals, and a circuit connecting the output of said differential amplifier to the control grid of one of said pair of tubes whereby the current therethrough is varied to constrain said tubes to equally share the current flow in said utilization circuit.

4. A load sharing circuit comprising, a pair of discharge tubes each having at least an anode, cathode and control grid, said tubes being connected in parallel with each other and in series with a utilization circuit, cathode resistors individual to each of said tubes having their terminals remote from said cathode connected together and to said utilization circuit, a direct coupled differential amplifier having an input circuit connected between the cathodes of said pair of discharge tubes, the output circuit of said differential amplifier being connected to the control grid of one of said discharge tubes, and means for impressing a control potential on the control grid of the other of said discharge tubes.

5. A voltage regulator comprising, a source of direct current potential, a load circuit having one terminal in common with one terminal of said source, a pair of discharge tubes each having at least an anode, cathode and control grid, said tubes being connected in parallel with each other and in series with the remaining terminal of said source and the remaining terminal of said load circuit, impedance means in the anode-cathode circuits of said tubes for producing a potential difference between like terminals in the cathode-anode paths of said tubes, said potential difference being proportional to the relative current flow in said tubes, an amplifier having its input connected between said like terminals and its output connected to the control grid of one of said tubes, means for deriving a potential from said load circuit proportional to the potential impressed thereon, and means for applying said derived potential to the control electrode of the other of said tubes in a sense such as to counteract variation in load circuit potential.

6. A voltage regulator comprising, a source of potential, a pair of discharge tubes each having at least an anode, cathode and control grid each of said tubes having their anodes connected to the positive terminal of said source, a first resistor connected to the cathode of one of said tubes, a second resistor connected to the cathode of the other of said tubes, the terminals of said first and second resistors remote from the cathodes being connected together and to one terminal of a load circuit, the remaining terminal of said load circuit being connected to the remaining terminal of said potential source, means for deriving a potential from said load circuit proportional to the potential impressed thereon, means for applying said derived potential to the control electrode of one of said discharge tubes in a sense such as to counteract variation in load circuit potential, a direct coupled amplifier connected between the cathodes of said discharge tubes, and means for impressing the output thereof on the control electrode of the other of said discharge tubes.

References Cited in the file of this patent

UNITED STATES PATENTS

| | | |
|---|---|---|
| 1,110,550 | Hewitt | Sept. 15, 1914 |
| 2,316,044 | Blair | Apr. 6, 1943 |
| 2,337,918 | Moyer | Dec. 28, 1943 |
| 2,450,216 | Ainsworth | Sept. 28, 1948 |
| 2,481,925 | Hegbar | Sept. 13, 1949 |
| 2,572,690 | Bixby | Oct. 23, 1951 |
| 2,612,632 | Ayres et al. | Sept. 30, 1952 |